(12) United States Patent
Sagalovskiiy et al.

(10) Patent No.: US 8,076,898 B2
(45) Date of Patent: Dec. 13, 2011

(54) METHOD OF BRUSHLESS DC MOTOR CONTROL AND ITS APPLICATION

(75) Inventors: Andreiy Vladimirovich Sagalovskiiy, Moscow (RU); Juliiy Abelevich Aranson, Moscow (RU); Vladimir Iosifovich Sagalovskiiy, Moscow (RU); Ol'ga Nikolaevna Gmyzina, Moscow (RU); Dmitriiy Aleksandrovich Shkad', Moscow (RU)

(73) Assignee: Oilfield Equipment Development Center Limited, Mahe, Victoria (SC)

( * ) Notice: Subject to any disclaimer, the term of this patent is extended or adjusted under 35 U.S.C. 154(b) by 560 days.

(21) Appl. No.: 12/278,940

(22) PCT Filed: Feb. 8, 2006

(86) PCT No.: PCT/RU2006/000048
§ 371 (c)(1),
(2), (4) Date: Feb. 27, 2009

(87) PCT Pub. No.: WO2007/091910
PCT Pub. Date: Aug. 16, 2007

(65) Prior Publication Data
US 2009/0195201 A1    Aug. 6, 2009

(51) Int. Cl.
*H02P 27/04* (2006.01)
*H02P 6/00* (2006.01)
*H02P 6/18* (2006.01)
*H02P 7/00* (2006.01)
*H02P 27/00* (2006.01)
*G05B 11/28* (2006.01)

(52) U.S. Cl. ............. 318/802; 318/400.01; 318/400.34; 318/432; 318/459; 318/500; 318/599; 318/700; 318/810; 318/811; 318/812

(58) Field of Classification Search ............. 318/400.01, 318/400.34, 432, 459, 500, 599, 700, 802, 318/810, 811, 812
See application file for complete search history.

(56) References Cited

U.S. PATENT DOCUMENTS

| | | | |
|---|---|---|---|
| 6,326,760 B1 | 12/2001 | Cardoletti et al. | |
| 6,362,441 B1 * | 3/2002 | Xie | 200/86.5 |
| 6,879,124 B1 * | 4/2005 | Jiang et al. | 318/400.35 |
| 6,995,539 B1 * | 2/2006 | Hansson et al. | 318/800 |

(Continued)

FOREIGN PATENT DOCUMENTS

EP    0735662    10/1996
(Continued)

*Primary Examiner* — Bentsu Ro
*Assistant Examiner* — Gabriel Agared
(74) *Attorney, Agent, or Firm* — Patterson & Sheridan, L.L.P.

(57) ABSTRACT

The invention relates to electric engineering, in particular to methods for controlling an ac electronic motor. The inventive control method consists in starting and rotating a rotor upon EMF signals in current-free sections of an armature winding, in converting the EMF signals into discrete logical level signals by a normalizer, in detecting switching points by means of a microcontroller and in displacing said points according to a load current quantity, the rotor speed of rotation and the inductance of the armature winding sections, wherein the switching points are calculated and displaced with respect to bridging times of the free sections EMF whose voltage levels are different from zero. The inventive device is characterized in that it comprises a reference level displacing unit (26), which is arranged in the normalizer between a divider 22 and a comparator unit (23) and which consists of a current sensor (27), a voltage sensor (27), two adders (29, 30) and an inverter (31).

7 Claims, 3 Drawing Sheets

U.S. PATENT DOCUMENTS

Figure 1:
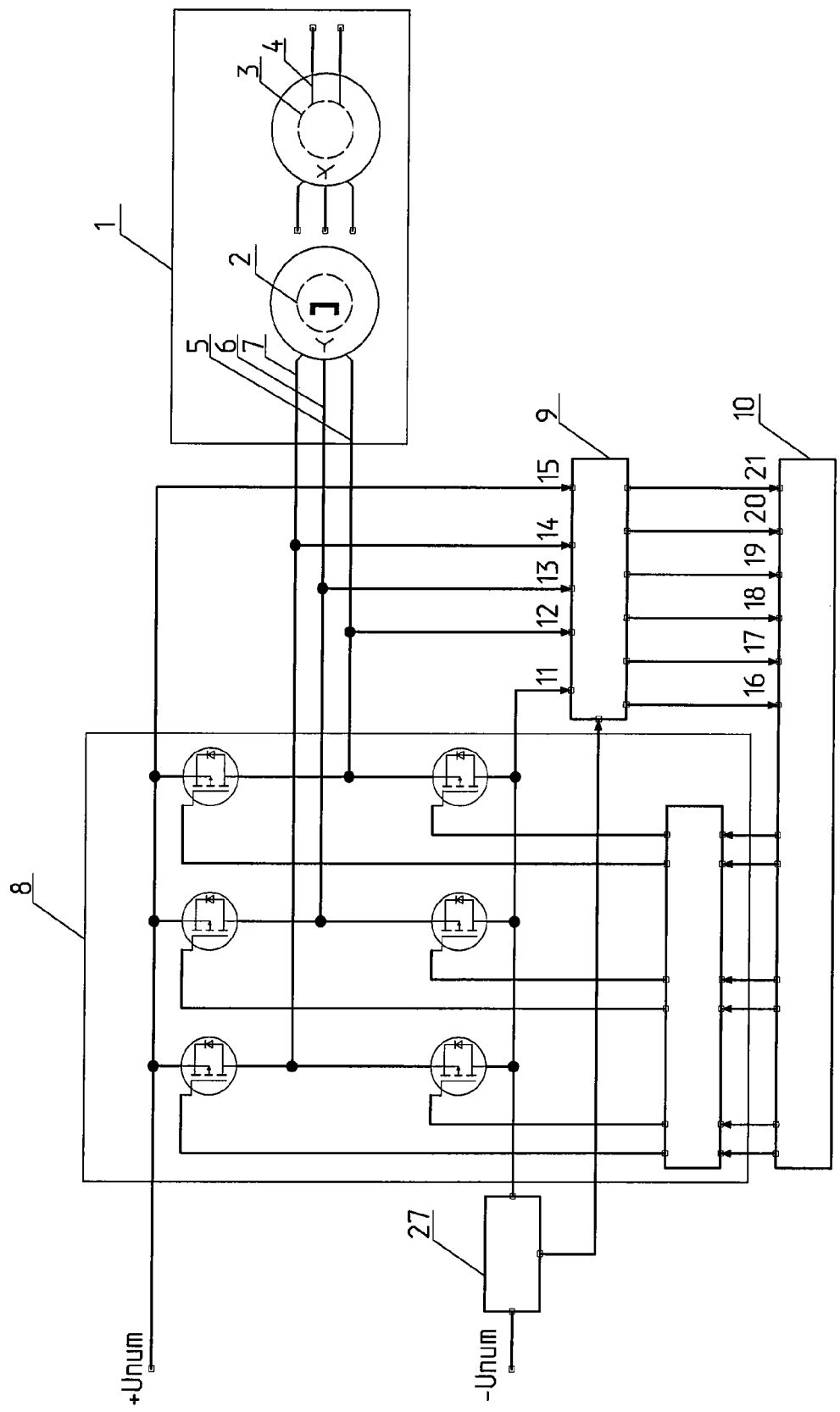

| | | | | |
|---|---|---|---|---|
| 7,129,669 B2 * | 10/2006 | Mamyoda | ...................... | 318/685 |
| 7,141,949 B2 * | 11/2006 | Harwood | ................. | 318/400.35 |
| 7,177,153 B2 * | 2/2007 | Radosevich et al. | ........... | 361/699 |
| 7,239,098 B2 * | 7/2007 | Masino | ..................... | 318/400.35 |
| 7,288,910 B2 * | 10/2007 | Dooley | .................... | 318/400.21 |
| 7,301,298 B2 * | 11/2007 | Shao et al. | .................... | 318/599 |
| 7,443,128 B2 * | 10/2008 | Bieler et al. | .................. | 318/723 |
| 2002/0140395 A1 * | 10/2002 | Tazawa et al. | ................. | 318/727 |
| 2002/0195982 A1 * | 12/2002 | Copeland | ...................... | 318/439 |
| 2004/0080289 A1 * | 4/2004 | Kawaji et al. | ................. | 318/254 |

FOREIGN PATENT DOCUMENTS

| | | |
|---|---|---|
| RU | 2150780 | 6/2000 |
| RU | 2207700 | 6/2003 |

* cited by examiner

METHOD OF BRUSHLESS DC MOTOR CONTROL AND ITS APPLICATION

PERTINENT ART

This invention relates to the field of electrical engineering, and more particularly to methods of brushless DC motor control applicable particularly for use in a submersible brushless DC motor as a submersible pump drive commonly used in the petroleum industry.

PRIOR KNOWLEDGE

A method of control of a brushless DC motor, including such functions as electric motor synchronous start-up and rotary valve rotation to be actuated by EMF signals transmitted over a current-free armature coil, was investigated in the previous invention (Certificate of authorship: USSR 1774455, кл. H 02 P 6/02, 1992).

This method results in the determination of inaccurate switching times resulting in loss of electric motor running performance and service life.

A method of brushless DC motor control is also known in which armature coil switching times are determined with respect to zero crossing times of back-EMF signals in a current-free coil using a mathematical model of the motor (Radim Visinka, Leos Chalupa, Ivan Skalka. "Operation of MOTOROLA microcontroller controlled electric motors", magazine "CHIP NEWS: Microdrive Digital Control", No. 1, 1999, p. 14-16).

This method of switching time correction does not, however, take into account the value of load current, motor speed and cabled motor inductance and thus is not suitable for brushless DC motor control for increased values of coil inductance.

A further method of brushless DC motor control is known in which armature coil switching times are determined in a current-free coil with respect to zero crossing times of back-EMF signals in a current-free coil using a mathematical model of the motor, which armature coil switching times depend on the values of current load, rotor speed and armature coil inductance (see Patent RU2207700C2 publ. 27.06.2003, МПК[7] H02P6/00, H02P6/18, H02K29/00, H02K29/06).

However, this method only provides an allowable range for variation of armature coil switching time limited to a maximum of 30 degrees of electrical phase with respect to the zero crossing time of the corresponding back-EMF signal. Furthermore, taking into account the period required for determination of the switching time from the zero crossing time of the back-EMF signal (which may account for a value of 10-15 degrees of electrical phase depending on speed), the value of 15-20 degrees of electrical phase may be considered as an accessible range for variation of the switching time.

As a result, the brushless DC motor efficiency may be decreased for high coil inductance values. Furthermore, for large coefficients of electric field distortion which require shifting of switching times by more than 20 electric degrees, the brushless DC motor may become out of control.

DISCLOSURE OF INVENTION

The object of this invention is to provide a method that is efficient enough for operation of different brushless DC motors.

The technical result attained makes it possible to increase the brushless DC motor efficiency and to control the brushless DC motor functions with considerably distorted electric field coefficients.

The technical result is attained by using a method of controlling a brushless DC "star" armature coils connected to outputs of a full-wave frequency converter outputs constructed as a three-phase reverse diode bridge including such functions as start-up and rotary rotation actuated by EMF signals transmitted over a current-free armature coil, conditioning of EMF signals by means of a normalizer and their transformation to logical level discrete signals, delivery of discrete signals to microcontroller inputs, determination by means of a microcontroller of an armature coil switching time shifted with respect to a time when a back-EMF signal crosses a non-zero reference voltage level using an electrical motor mathematical mode, the shift of the switching time depending on the values of current load, rotor speed and armature coil inductance and compliant to the rotor angle specified for the motor, where timing of current coming over the three-phase bridge reverse diode is used for the integral estimation of the load current, the rotor speed and the armature coil inductance existing values.

This device consists of a full-wave frequency converter constructed as a three-phase reverse diode bridge, a microcontroller and a normalizer and is distinguished from the prior art by a reference level shift block installed between a voltage divider and a voltage comparator block of the normalizer wherein the reference level shift block comprises a current sensor, a voltage sensor, two adders and an inverter, in which inputs of the first adder are connected to the current and voltage sensors, inputs of the second adder are connected to an output of the first adder and to a midpoint of the voltage divider and an output of the second adder is connected to a first reference level input of the comparator block directly and to a second reference level input of the comparator block via the inverter.

The reference level shifting block in the device makes it possible to calculate and shift switching time parameters with respect to the time when a back-EMF signal in a current-free coil crosses a non-zero voltage level, thus providing the possibility of large shifts in switching time angles, increasing the motor efficiency and improving the operation of brushless DC motors in general including those with large coefficients of electric field distortion.

Figure 2:
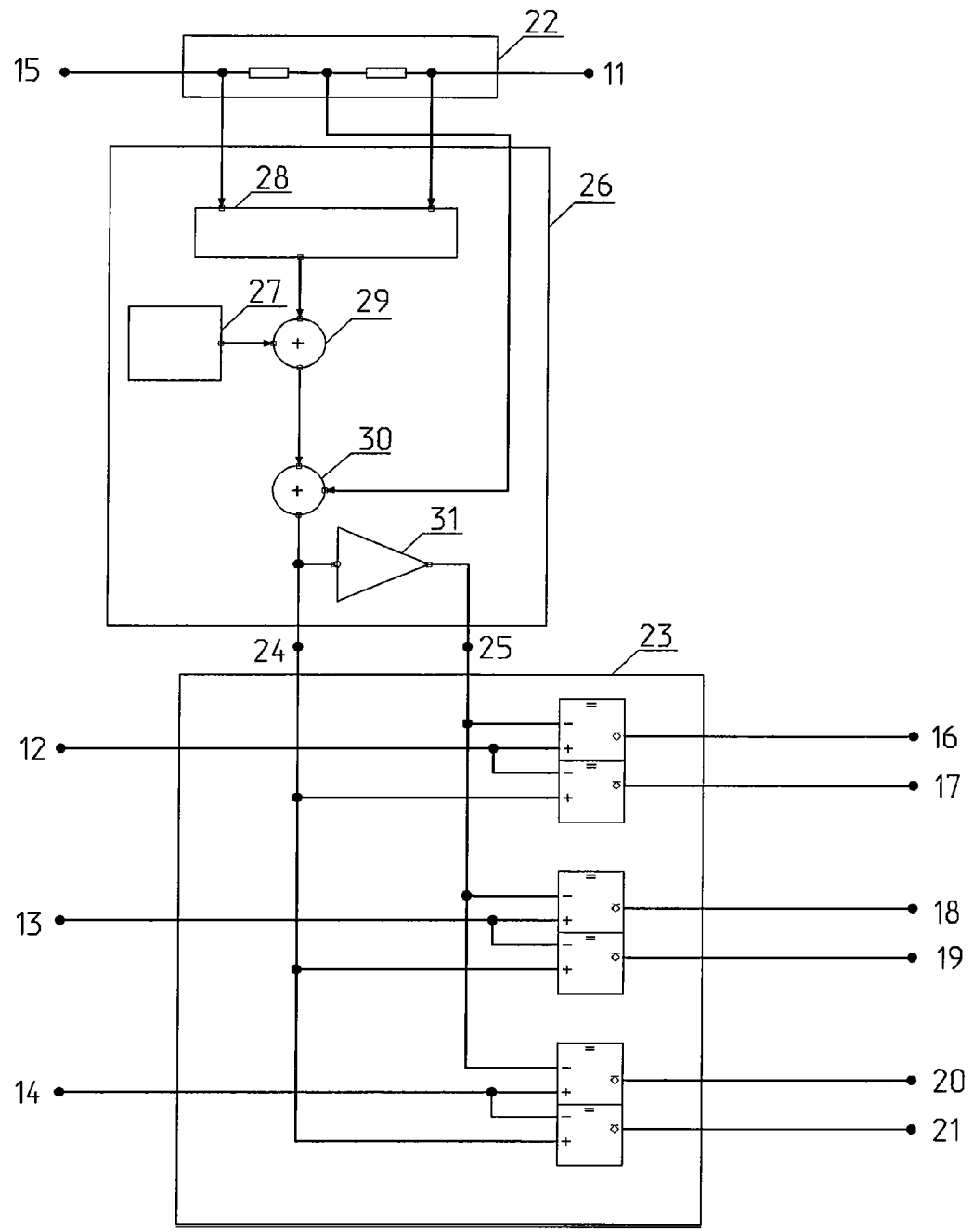
Figure 3:
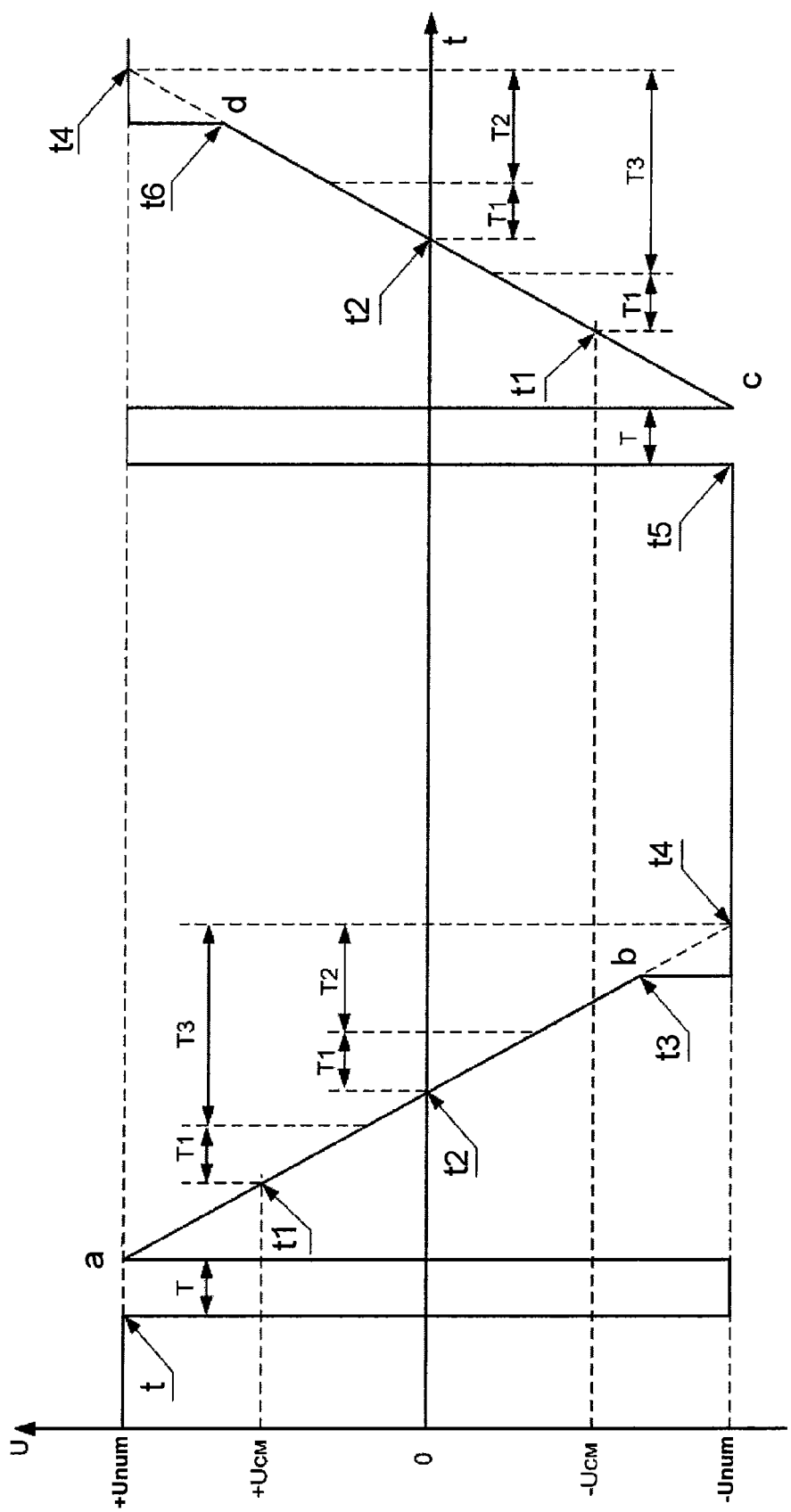

This invention is illustrated by the following drawings:

FIG. 1—Functional diagram of a brushless DC motor control;

FIG. 2—Functional diagram of a normalizer together with a reference level shifting block;

FIG. 3—Normalizer input armature coil voltage diagram;

The brushless DC motor 1 is provided with a permanent magnet rotor 2 functioning as an inductor and a rotor 3 made of soft magnetic material with an exciting coil 4. Armature "star" coils 5, 6, 7 are connected to the outputs of a half-wave frequency converter 8 constructed as a three-phase reverse diode bridge and to the inputs 12, 13 and 14 of a normalizer 9. The inputs 11 and 15 of the normalizer 9 are connected to the voltage sources. The signals coming from the outputs 16, 17, 18, 19, 20 and 21 of the normalizer 9 are transmitted to a microcontroller 10 that generates the values of control combinations specified for the frequency converter 8. The normalizer 9 consists of a divider 22 and a comparator block 23 provided with two reference level inputs 24 and 25. A reference level shifting block 26 used for estimation of comparator operation thresholds is provided between the divider 22 and the comparator block 23.

The reference level shifting block 26 consists of a current sensor 27, a voltage sensor 28, two adders 29 and 30 and an inverter 31. The inputs of the adder 29 are connected to the current sensor 27 and the voltage sensor 28, and the inputs of the adder 30 are connected to the output of the adder 29 and the midpoint of the divider 22. The output of the adder 30 is connected to the reference level input 24 directly and the reference level input 25 by way of the inverter 31.

The following parameters are specified in the input voltage diagram of the normalizer 9:
t—time of coil cutoff from "+" of power source;
T—time interval within which current is transmitted under the influence of the self-induction EMF over the frequency converter reverse diode 8 in the same direction;
Sections ab and cd—intervals within which the values of voltage specified at the input of the normalizer 9 matches the back-EMF of the coil;
$U_{CM}$—rate of reference level shifting voltage formed by means of the reference level shifting block depending on voltage Unum and load current;
t1—time at which back-EMF of the coil crosses reference voltage level corresponding to angle $\alpha_0$-n°;
t2—time at which back-EMF of the coil crosses zero voltage level corresponding to angle $\alpha_0$;
t3—time of coil connection to "−" of power source;
T1—time delay to be specified by microcontroller when calculating the values of switching time and normalizer filter delays;
t4—switching time without the armature response time shift corresponding to angle $\alpha_0$+30°;
t5—time of coil cut off from "−" of the power source;
t6—time of coil connection to "+" of the power source
T2—the maximum allowable value of switching time shift estimated with respect to the time at which the back-EMF crosses the zero voltage level.
T3—the maximum allowable value of switching time shift estimated with respect to the time at which the back-EMF crosses the reference voltage level $U_{CM}$.

EMBODIMENT OF CLAIMED INVENTION

The claimed method of brushless DC motor control may be implemented as follows. On starting up the motor by means of EMF signals actuated from the armature coil current-free sections, microcontroller 10 produces the values of cyclic control combination and transmits them to the full-wave frequency converter 8 for 120° key switching. The rotor 2 or 3 starts turning. If with the first control combination transmitted, frequency converter 8 shuts off, for example, coil 6 from "+" of the power source at time t (FIG. 3), the normalizer 9 consisting of the reference level shifting block converts the value of voltage of coil 6 specified at input 13 to the logical level discrete signals delivered to outputs 18 and 19. The signals transmitted to the inputs of the microcontroller 10 contain the following information:
Time data—T (FIG. 3)—time interval within which current is transmitted under the influence of the self-induction EMF over the frequency converter reverse diode 8 in the same direction;
Time data—t1 (FIG. 3)—time at which back-EMF in the coil disconnected from the voltage source conforms to angle $\alpha_0$-n° depending on level $U_{CM}$.

The microcontroller 10 calculates the time specified for connection of the coil 6 to "−" of the power source using the time corresponding to angle $\alpha_0$-n° and the time period T when current flows over the frequency converter reverse diode. The time period T is used for the estimation of the armature response and the determination of the switching time. For this purpose, the estimated time t4 is shifted by a value proportional to the parameter T. As may be seen in FIG. 3, with the switching time t3 estimated with respect to the back-EMF zero voltage crossing point as in prior art methods—the parameter t2 (angle $\alpha_0$)—the time interval T2 is considered as the accessible switching range. In fact, the period of normalizer filter delay has a value of 10-15 electric degrees (time T1) and the value of the switching time t3 is evaluated by the processor only after t2.

In the claimed method, the interval T3 is specified as the accessible switching range, because the value of filter delay and calculation time is measured from parameter t1 (angle $\alpha_0$-n). As a matter of fact, large switching time shift angles are accessible and make it possible to operate brushless DC motors within electric fields having large distortion coefficients.

The method of brushless DC motor control may be efficiently applied in conditions where cables of excessively long length are required, for example with an oil extracting submersible pump driven by a brushless DC motor controlled from a surface-based station.

The invention claimed is:
1. A method of controlling a three phase motor wherein each phase of the motor is driven from first and second power terminals by a respective switch arrangement comprising:
a first switch and a first reverse diode connected in parallel between the first power terminal and a motor phase and a second switch and a second reverse diode connected in parallel between the second power terminal and the motor phase, the method comprising:
operating the first switch so as to disconnect the motor phase from the first power terminal while the motor phase is disconnected from the second power terminal;
determining a first time when a back-EMF of the motor phase crosses a non-zero reference back-EMF voltage level, which first time is earlier than a second time when the back-EMF next crosses a zero voltage level;
using the first time to determine a third time later than the first time; and
operating the second switch so as to connect the motor phase to the second power terminal at the third time.
2. The method as claimed in claim 1 comprising:
determining a fourth time from the first time using a mathematical model of the motor and knowledge of a frequency with which the first and second switches are driven;
determining a time period during which current is transmitted by the second reverse diode and flows through the motor phase following disconnection of the motor phase from the first power terminal; and
determining the third time by subtracting from the fourth time a time interval which is proportional to the determined time period.
3. The method as claimed in claim 2 wherein the time period is a function of current load and inductance of the motor phase and a function of rotor speed.
4. The method as claimed in claim 2 comprising:
monitoring a current supplied to the motor; and
determining the time period from the monitored current.
5. The method as claimed in claim 4 comprising:
determining the non-zero reference back-EMF level from a first voltage level associated with the first power terminal, a second voltage level associated with the second power terminal and the monitored current supplied to the motor.
6. A drive device for a three-phase motor, which drive device is configured to implement the method of controlling a motor of claim 1.

7. A normalizer device for generating switching time control signals for a three-phase motor driven from first and second power terminals, the normalizer device comprising:
- a first input for receiving a first power terminal voltage from one of the first and second power terminals and a second input for receiving a second power terminal voltage from the other of the first and second power terminals;
- a voltage divider;
- a reference level shift block configured to receive the first and second power terminal voltages, to receive a voltage from a mid-point of the voltage divider, to receive a motor current and to generate positive and negative non-zero reference back-EMF levels; and
- a comparator block configured to receive the positive and negative non-zero reference back-EMF levels from the reference level shift block, to receive voltages from each of the motor phases and to generate switching time control signals based on a result of comparisons between the positive and negative non-zero reference back-EMF levels and each of the motor phase voltages.

* * * * *